US012643517B2

(12) United States Patent
Carson, IV

(10) Patent No.: US 12,643,517 B2
(45) Date of Patent: Jun. 2, 2026

(54) PORTABLE HYDRAULIC PARK BRAKE RELEASE APPARATUS AND METHOD FOR WORK VEHICLE

(71) Applicant: Deere & Company, Moline, IL (US)

(72) Inventor: William Waller Carson, IV, Independence, KS (US)

(73) Assignee: DEERE & COMPANY, Moline, IL (US)

( * ) Notice: Subject to any disclaimer, the term of this patent is extended or adjusted under 35 U.S.C. 154(b) by 442 days.

(21) Appl. No.: 18/332,835

(22) Filed: Jun. 12, 2023

(65) Prior Publication Data

US 2024/0409075 A1     Dec. 12, 2024

(51) Int. Cl.
B60T 13/58       (2006.01)
B60T 13/22       (2006.01)
B60T 13/68       (2006.01)

(52) U.S. Cl.
CPC ............ B60T 13/583 (2013.01); B60T 13/22 (2013.01); B60T 13/686 (2013.01); *B60T 2270/402* (2013.01)

(58) Field of Classification Search
CPC ...... B60T 13/583; B60T 13/22; B60T 13/686; B60T 2270/402; B60T 17/086
See application file for complete search history.

(56) References Cited

U.S. PATENT DOCUMENTS

| | | | | |
|---|---|---|---|---|
| 3,272,566 | A * | 9/1966 | Clack | B60T 17/083 188/170 |
| 5,984,425 | A | 11/1999 | Orzal | |
| 6,170,922 | B1 * | 1/2001 | Vannorsdel | B60T 13/22 303/3 |
| 2020/0080602 | A1 | 3/2020 | Crawford et al. | |
| 2021/0122227 | A1 | 4/2021 | Bindl et al. | |
| 2021/0156403 | A1 | 5/2021 | Rushton et al. | |

FOREIGN PATENT DOCUMENTS

| | | |
|---|---|---|
| DE | 2236312 A1 | 2/1974 |
| DE | 102019008547 B3 | 2/2021 |

OTHER PUBLICATIONS

Summit Hydraulics, 1" Ag Hydraulic Quick Connect Coupler Set, 1" NPT Thread, 2023. (5 pages).
Genuine Innovations 20 Gram Non Threaded CO2 Cartridges—The Jay Cloud Cyclery, 2020. (5 pages).
Amazon, Cycling Deal 16g, 20g or 25g Threaded CO2 Cartridges Refills for Bike Bicycle Pump CO2 Inflator Heads—Great Refill for Mountain or Road Bikes Tires, 2023. (10 pages).

(Continued)

*Primary Examiner* — David R Morris
(74) *Attorney, Agent, or Firm* — KLINTWORTH & ROZENBLAT LLP

(57) ABSTRACT

An assembly for a work vehicle includes an emergency portable hydraulic park brake release assembly for a spring applied, hydraulically released park brake. The portable hydraulic park brake release assembly includes a CO2 cartridge which is activated when the park brake is in the applied position. This causes gas from the CO2 cartridge to be introduced into a hydraulic conduit of the park brake to move to move the park brake to the released position.

19 Claims, 4 Drawing Sheets

(56) References Cited

OTHER PUBLICATIONS

Crosman 12 gram CO2, 40 Pack website at https://www.airgundepot.com/crosman-co2-40ct.html, 2023. (8 pages).

German Search Report issued in application No. 102024113062.8 dated Feb. 24, 2025, 08 pages.

The Prairie Moon Company, Liss Stainless Soda Siphon Replacement Parts website at https://www.prairiemoon.biz/listsosirepa.html, Copyright 2025. (4 pages).

* cited by examiner

PORTABLE HYDRAULIC PARK BRAKE RELEASE APPARATUS AND METHOD FOR WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to a portable hydraulic park brake release apparatus which uses $CO_2$ gas for the release of a spring applied, hydraulically released park brake, and method of using same.

BACKGROUND OF THE DISCLOSURE

Conventional park brakes use electro-hydraulic solenoid valves that are spring applied, hydraulically released, commonly referred to as SAHR. Disruptions to the electric and hydraulic systems, or problems with the solenoid valve, can cause the park brake to be locked on without being able to disengage the park brake, thereby preventing the vehicle from being moved to enable service of the vehicle.

SUMMARY OF THE DISCLOSURE

The disclosure provides a system for a work vehicle includes an emergency portable hydraulic park brake release apparatus for a spring applied, hydraulically released park brake. The emergency portable hydraulic park brake release apparatus includes a $CO_2$ cartridge which is activated when the park brake is in the applied position. This causes gas from the $CO_2$ cartridge to be introduced into a hydraulic conduit of the park brake to move to move the park brake to the released position.

A method of activating an emergency portable hydraulic park brake release apparatus for a spring applied, hydraulically released park brake of a work vehicle includes applying a brake of the spring applied, hydraulically released park brake; and activating a $CO_2$ cartridge to inject gas into a hydraulic conduit of the park brake to release the spring applied, hydraulically released park brake.

A system for a work vehicle includes a park brake assembly and a portable hydraulic park brake release apparatus. The park brake assembly includes a park brake movable between an applied position and a released position, a spring proving an application force to bias the park brake into the applied position, and a hydraulic actuator selectively operable to move the park brake into the released position against the application force imposed by the spring, a control valve movable between a first configuration coupling the hydraulic actuator to a hydraulic reservoir to move the park brake into the applied position and a second configuration coupling the hydraulic actuator to a source of pressurized hydraulic fluid to move the park brake into the released position, and a hydraulic conduit between the control valve and the piston chamber. The hydraulic actuator includes a piston mounted within a piston chamber. The portable hydraulic park brake release apparatus includes a portable adapter and a portable $CO_2$ cartridge removably coupled to the hydraulic conduit via the portable adapter. The park brake is moved from the applied position to the released position upon activation of the $CO_2$ cartridge.

The control valve may be a solenoid valve.

The control valve is removably positioned within a hydraulic fitting interface fixedly coupled to the hydraulic conduit. The control valve is removed from the hydraulic fitting interface and replaced with the $CO_2$ cartridge to activate the portable hydraulic park brake release apparatus.

The portable adapter has a first end configured to be removably received in the receptacle of the hydraulic fitting interface and a second end opposite the first end and defining a receptacle configured to removably receive a head of the portable $CO_2$ cartridge.

The receptacle of the hydraulic fitting interface is sized to an ISO standard hydraulic fitting.

The adapter includes an internal passage coupling a first opening in the first end of the portable adapter to a second opening in the second end of the portable adapter. When the portable adapter is connected to the hydraulic fitting interface, the receptacle of the hydraulic fitting interface is in fluid communication with the receptacle of the portable adapter.

A seal is disposed between the receptacle of the hydraulic fitting interface and the first end of the portable adapter.

The portable $CO_2$ cartridge is a 12 g $CO_2$ cartridge, a 16 gram $CO_2$ cartridge, or a 20 g $CO_2$ cartridge.

In an embodiment, the receptacle of the portable adapter is threaded to engage threads of the $CO_2$ cartridge.

The receptacle of the portable adapter may include a nib to puncture a membrane of the $CO_2$ cartridge to release $CO_2$ gas to the hydraulic conduit via the portable adapter and the hydraulic fitting interface.

The portable adapter includes a check valve disposed within the first end configured to be normally open and seat above a threshold pressure set to a nominal operating pressure to move the park brake to the applied position.

A method of overriding a hydraulic park brake assembly in a work vehicle is provided. The park brake assembly includes a park brake movable between an applied position and a released position, a spring proving an application force to bias the park brake into the applied position, a hydraulic actuator, having a piston mounted within a piston chamber, selectively operable to move the park brake into the released position against the application force imposed by the spring, and a control valve coupled to a hydraulic fitting interface and configured to couple the hydraulic actuator to a source of pressurized hydraulic fluid to move the park brake into the released position. The method includes providing a portable hydraulic park brake release apparatus, including a portable adapter and a portable $CO_2$ cartridge; removing the control valve from the hydraulic fitting interface; connecting the portable adapter to the hydraulic fitting interface; connecting the portable $CO_2$ cartridge to the portable adapter; and activating the portable $CO_2$ cartridge to release $CO_2$ gas to a hydraulic conduit between the control valve and the piston chamber. The release of $CO_2$ gas into the hydraulic conduit causes the park brake to move from the applied position to the released position.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
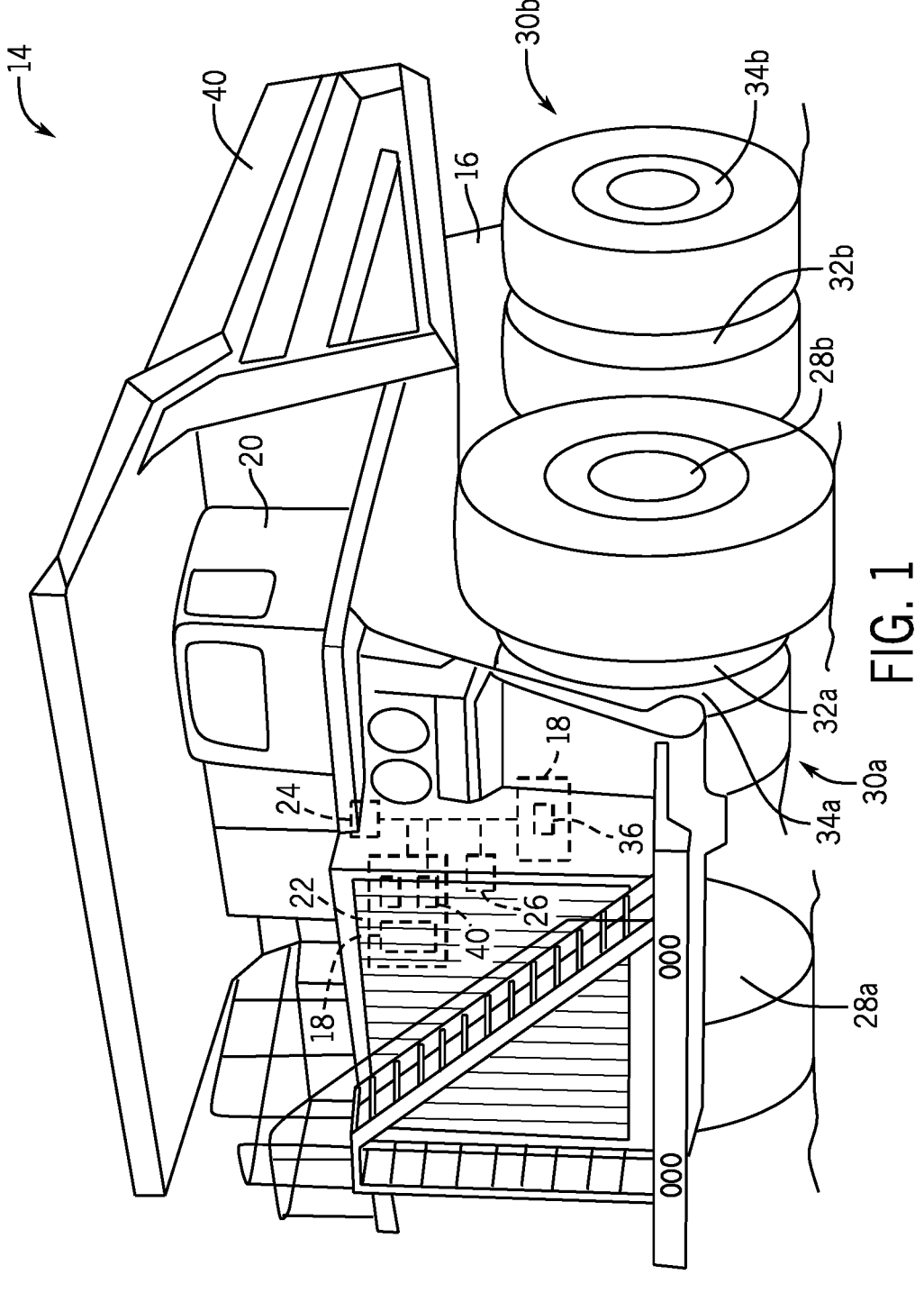
FIG. 1 is a simplified perspective view of an example work vehicle in the form of a heavy-duty rigid frame dump truck in which an emergency inflator cartridge assembly can be used to emergency release a park brake thereof in accordance with this disclosure.

The following describes one or more example embodiments of the disclosed axle, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "downstream," "upstream," "longitudinal," "radial," "axial," "circumferential," "lateral", and "transverse" may be used. Such terms are defined, at least in part, with respect to a dual wheel arrangement, an axle, transmission components, gear set components, wheel hubs, and/or a hydraulic system. As used herein, the term "longitudinal" indicates an orientation along the length of the apparatus; the term "lateral" indicates an orientation along a width of the apparatus and orthogonal to the longitudinal orientation; and the term "transverse" indicates an orientation along the height of the apparatus and orthogonal to the longitudinal and lateral orientations. These orientations may be taken in relation to a work vehicle, or a travel direction of the work vehicle, to which the components may be attached.

Heavy-duty work vehicles, especially high load capacity dump trucks (e.g., 100+ ton capacity mining trucks), include spring applied, hydraulically released (SAHR) park brake assemblies. The SAHR park brake assembly includes a pair of brake assemblies and a hydraulic circuit including a common hydraulic conduit coupling the brake assemblies. Each wheel brake assembly has a brake, a spring which biases the brake into an applied position, and a brake release actuator which biases the brake into a released position. The hydraulic circuit includes a source of pressurized hydraulic fluid, and a solenoid-activated control valve for controlling fluid flow to and from the brake release actuators during normal vehicle operation. The brake release requires the supply of pressurized hydraulic fluid to the brake release actuators to overcome the spring force. If for some reason that the supply of pressurized hydraulic fluid to the brake release actuators, such as failure of the source either hydraulically or electrically, the brakes cannot be released. The present disclosure provides a portable hydraulic park brake release assembly for the work vehicle which overrides the spring to release the park brake. This allows for the vehicle to then be towed for service. The portable hydraulic park brake release assembly is provided by removing the solenoid-activated control valve within the hydraulic circuit of the work vehicle and replacing it with a $CO_2$ cartridge that is thereafter activated to infuse gas into the hydraulic circuit, which overcomes the spring. The hydraulic fluid in the park brake circuit has a low volume, and the volume of the $CO_2$ gas introduced by injection of the $CO_2$ gas from the cartridge has a greater volume than the volume of the hydraulic fluid. The $CO_2$ gas introduced into the hydraulic circuit will escapes past seals (not shown), and will dissolve into the hydraulic fluid, however, check valve allows more gas to replenish the pressure until the $CO_2$ cartridge is exhausted. Some of the gas will be dissolved into the hydraulic fluid, and when no longer under higher pressure may effervesce. However, since this portable hydraulic park brake release assembly is only used for emergency, enough time will pass before normal operation is resumed to degas the SAHR park brake assembly. This prevents aeration from occurring in the hydraulic pumps (which could lead to noise and/or poor performance (for example, poor shift quality)).

The following describes one or more example implementations of the disclosed portable hydraulic park brake release assembly for the SAHR park brake assembly.

A SAHR park brake assembly 10 and portable hydraulic park brake release assembly 12 are provided for a work vehicle 14. Referring to FIG. 1, in some embodiments, the disclosed work vehicle 14 may be a rigid frame mining truck, although, as noted, the axle described herein may be applicable to a variety of machines, such as on-highway trucks, construction vehicles, and agricultural vehicles. As shown, the work vehicle 14 may be considered to include a structural main frame or chassis 16, a drive train 18, an operator platform or cabin 20, a power train 22, a control system 24, and a hydraulic system 26. The work vehicle 14 may be supported off the ground by ground-engaging wheels or tracks. In the illustrated example, the work vehicle 14 includes a front axle (not shown) mounting a pair of single left/right steerable wheels 28a, 28b (one at each left/right lateral side of the work vehicle 14) and a rear axle (not shown in FIG. 1) mounting a pair of dual wheel arrangements 30a, 30b (one pair at each left/right side of the work vehicle 14). The dual wheel arrangements 30a, 30b each include an inboard wheel 32a, 32b and an outboard wheel 34a, 34b, with each inboard/outboard wheel of each dual wheel arrangement 30a, 30b, and each dual wheel arrangement 30a, 30b, being aligned coaxially along a common rotation axis R. The dual wheel arrangements 30a, 30b are mounted to opposite ends of the rear axle for rotation about the rotation axis R during travel of the work vehicle 14. It should be noted that the dual wheel arrangements 30a, 30b could be steerable in addition the front wheels 28a, 28b, and also that the front wheels 28a, 28b may be mounted to an axle in addition to the dual wheel arrangements 30a, 30b.

Generally, the drive train 18 has wheel steering components 36, including various devices (e.g., power steering pumps and lines, steering mechanisms, and the like) that couple manual (e.g., operator steering controls or wheel) and/or automated (via the control system 24) steering input to the wheels, such as the steerable front wheels 28a, 28b. The power train 22 includes a source of propulsion, such as an engine 38, which supplies power to the work vehicle 14, as either direct mechanical power or after being converted to electric or hydraulic power. In one example, the engine 38 is an internal combustion engine, such as a diesel engine, that is controlled by an engine control module (not shown) of the control system 24. It should be noted that the use of an internal combustion engine is merely an example, as the source of propulsion may be a fuel cell, an electric motor, a hybrid-gas electric motor, or other power-producing devices. In addition to providing tractive power to propel the work vehicle 14, the engine 38 may provide power to various onboard subsystems, including various electrical and hydraulic components of the work vehicle, and for off-boarding power to other sub-systems remote from the work vehicle 14. For example, the engine 38 may provide mechanical power that is converted to an electric format to run the electronics of the control system 24 and one or more electric drives of the work vehicle 14. The power train 22 thus may have mechanical to electrical power conversion components, one or more batteries, and associated electronics, including various alternators, generators, voltage regulators, rectifiers, inverters, and the like. The engine 38 may also provide mechanical power that is converted to hydraulic format to power various pumps and compressors that pressurize fluid to drive various actuators of the hydraulic system 26 in order to power wheel steering and braking and various work implements onboard the work vehicle 14. In this example, the work vehicle 14 has a load or dump bin 40 that may be raised and lowered during a dumping operation by one or more hydraulic piston-cylinder devices. The hydraulic system 26 may be coupled to and operated by the control system 24 in response to commands from an operator input device (e.g., operator controls, operator display device, etc.) in the cabin 20 or remote from the work vehicle 14. The hydraulic system 26 may include other components (e.g., valves, flow lines, pistons/cylinders, seals/gaskets, and so on), such that control of various devices may be effected with, and based upon, hydraulic, mechanical, or other signals and movements.

The control system 24 may be configured as a computing device with associated processor devices and memory architectures, as a hard-wired computing circuit (or circuits), as a programmable circuit, as a hydraulic, electrical, or electrohydraulic controller. The control system 24 may be configured to execute various computational and control functionality with respect to the work vehicle 14, including various devices associated with the drive train 18, the power train 22, the hydraulic system 26, and various additional components of the work vehicle 14. In some embodiments, the control system 24 may be configured to receive input signals in various formats (e.g., as hydraulic signals, voltage signals, current signals, and so on), and to output command signals in various formats (e.g., as hydraulic signals, voltage signals, current signals, mechanical movements, and so on). The control system 24 may also be configured to operate various aspects of the axle, which forms part of the drive and power trains 18, 22 of the work vehicle 14.

Figure 2:
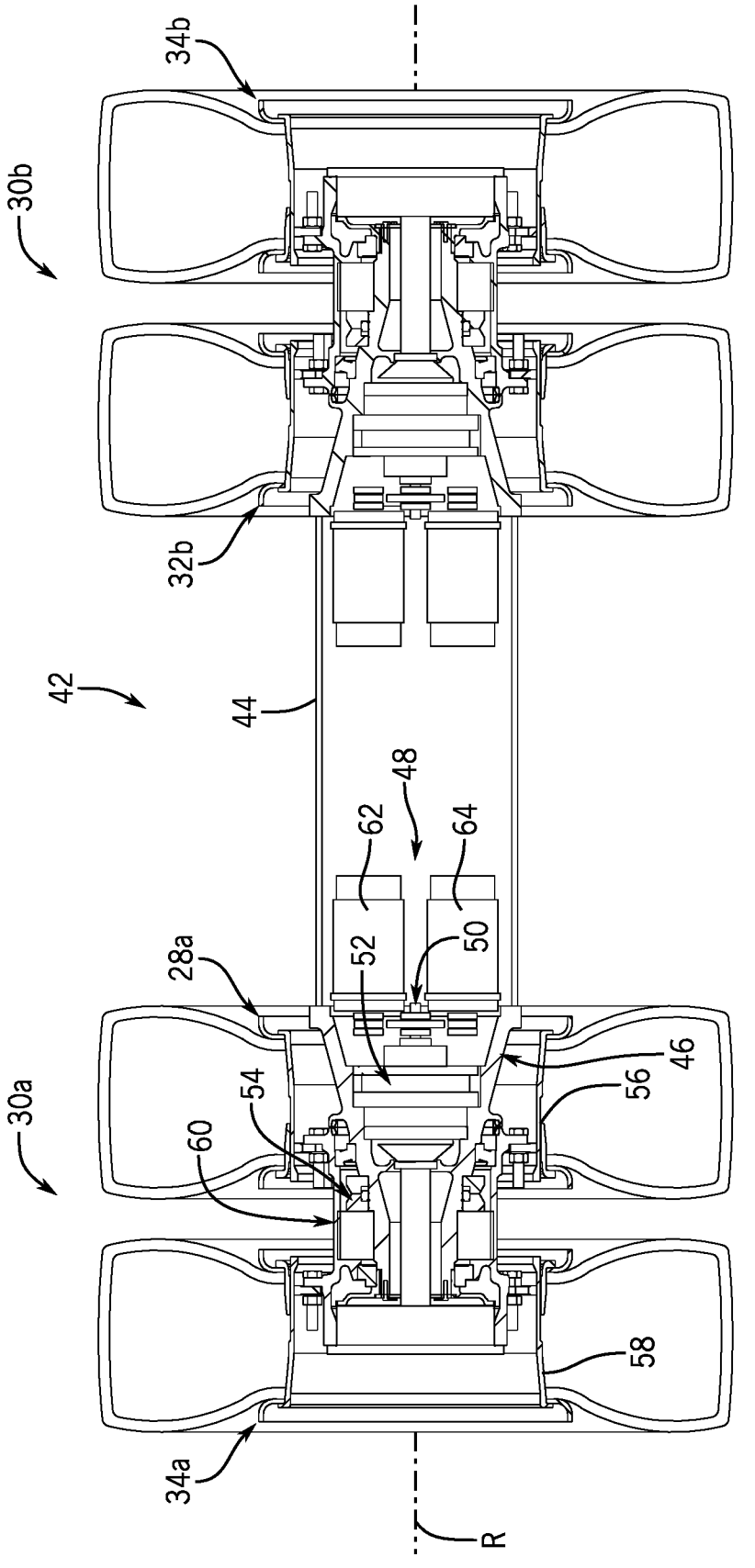
FIG. 2 is a schematic cross-sectional view of an example axle of the example work vehicle of FIG. 1.

Referring to FIG. 2, an example axle 42 has an axle housing 44 that is fixedly mounted to the frame or chassis 16 of the work vehicle 14. At each end of the axle housing 44 is one of the dual wheel arrangements 30a, 30b as well as power transmission, brake and housing components that facilitate mounting and rotation of the dual wheel arrangements 30a, 30b. It should be understood that the description below of the left end of the axle housing 44 (from the perspective of FIG. 2) may be considered a description of the corresponding components at the right end of the axle housing 44.

An axle hub 46 is fixed position to the axle housing 44 and mounts the power transmission and brake components of the axle 42, including an electric drive 48, input gear set 50, transmission gear set 52 and park brake assembly 54 of the SAHR park brake assembly 10. The axle hub 46 also mounts the dual wheel arrangement 30a for rotation about the rotation axis R. Specifically, the inboard and outboard wheels 32a, 34a include associated wheel hubs 56, 58 which are mounted for co-rotation with an output hub 60. Wheel bearings mount the output hub 60, and thereby the wheel hubs 56, 58, to the axle hub 46. The components of the park brake assembly 54 are located radially with a complementary fit relative to the inboard and outboard wheels 32a, 34a, the output hub 60, and the transmission gear set 52. Generally, the park brake assembly 54 is mounted around an output end of the axle hub 46.

The electric drive 48 may include two electric motors or e-machines 62, 64 at least partially, if not entirely, positioned within the axle housing 44. The e-machines 62, 64 may be permanent magnet type motors. The electric drive 48 is powered by, or part of, the power train 22 and receives power from the prime power source, which may be the engine 38, of the work vehicle 14. The electric drive 48 is coupled to the transmission gear set 52 though the input gear set 50. The input gear set 50 is connected to output shafts of the e-machines 62, 64 and to an input shaft of the transmission gear set 52. In general, the transmission gear set 52 functions to receive power input from the e-machines 62, 64 and output power to the output hub 60, and thereby the wheel hubs 56, 58 and ultimately the dual wheel arrangement 30a. The transmission gear set 52 may include various transmission components, such as various clutch packs, actuators, biasing members, and the like, that are not shown in the drawings.

Figure 3:
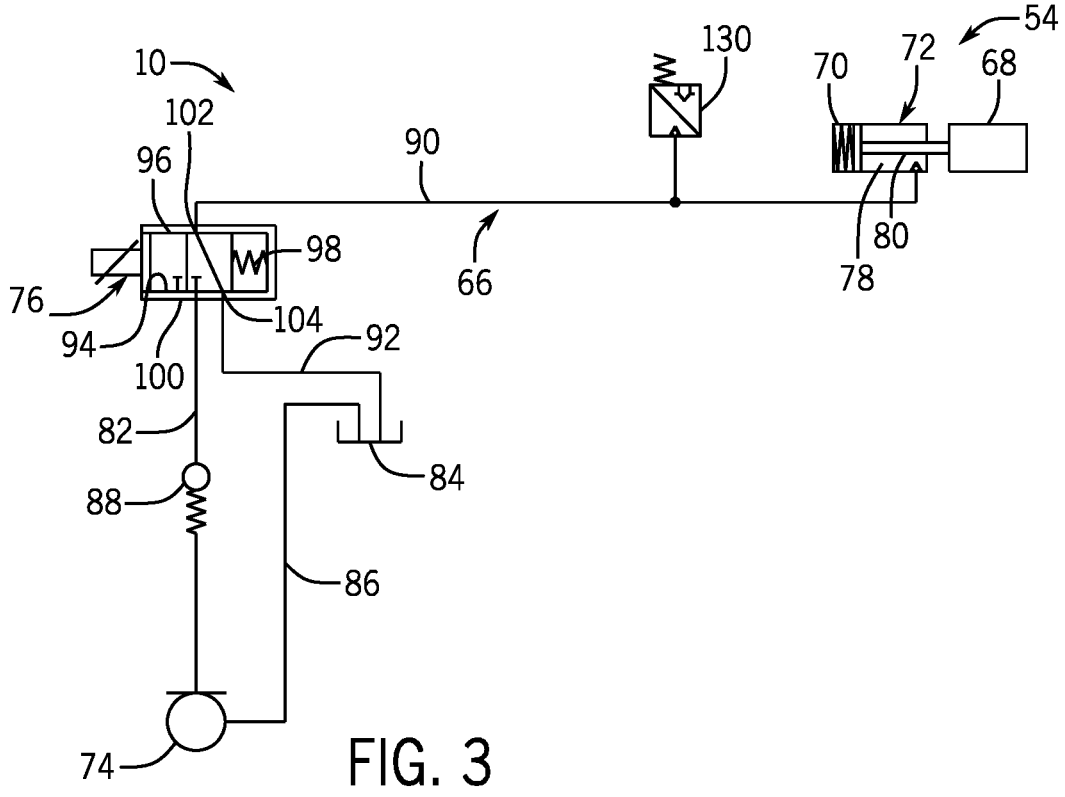
FIG. 3 is a schematic representation of a SAHR park brake assembly for use with the work vehicle.
Figure 4:
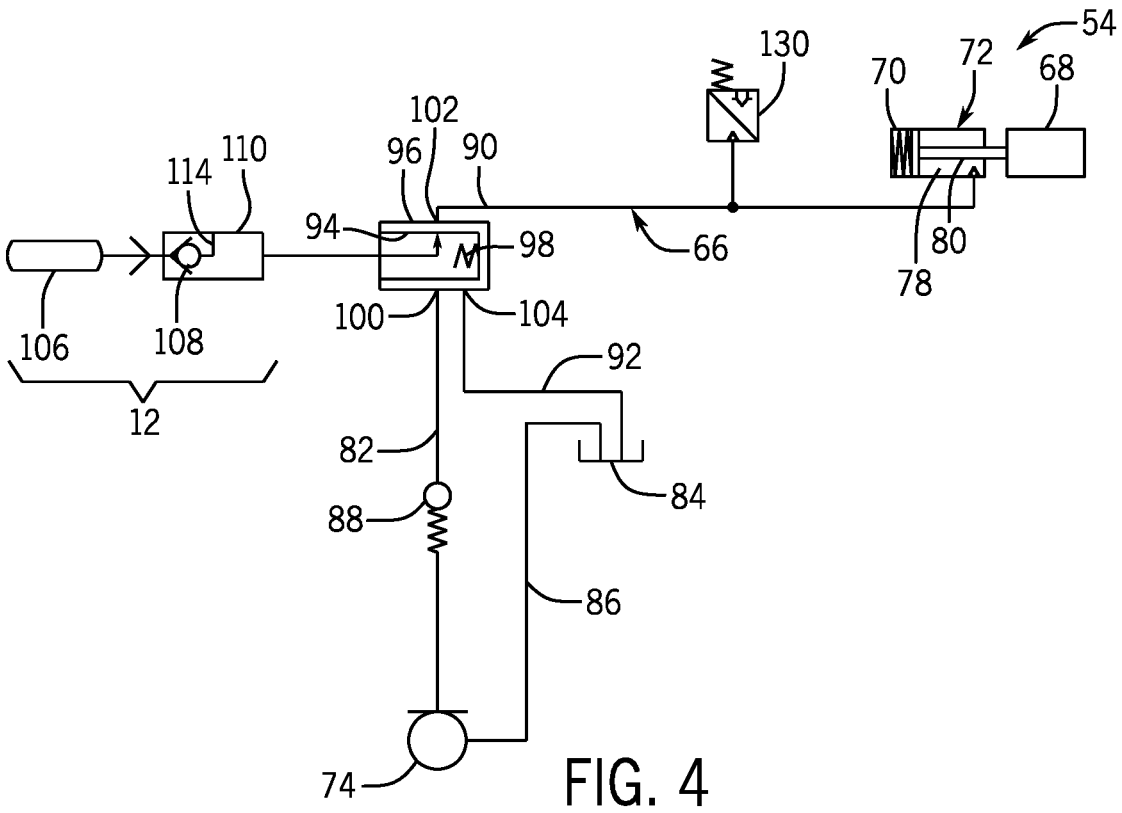
FIG. 4 is a schematic representation of the SAHR park brake assembly with a portable hydraulic park brake release assembly.

The axle 42 also includes the SAHR park brake assembly 10 as shown in FIG. 3. In particular, the axle 42 is operable in different brake modes, including a drive mode in which the SAHR park brake assembly 10 is disengaged, and a park brake mode with the SAHR park brake assembly 10 engaged. The SAHR park brake assembly 10 includes the pair of park brake assemblies 54 and a hydraulic circuit 66 which forms part of the hydraulic system 26 and is coupled to both park brake assemblies 54 by a common hydraulic conduit (not shown; FIGS. 3 and 4 only show one of the park brake assemblies 54). Each park brake assembly 54 has a park brake 68, a spring 70 which biases the park brake 68 into the applied position, and a brake release actuator 72 for overcoming the spring 70 to place the park brake 68 into the released position. The hydraulic circuit 66 includes a source 74 of pressurized hydraulic fluid, a solenoid-activated control valve 76 for controlling fluid flow to and from the brake release actuators 72 during normal vehicle operation. The park brake 68 of each park brake assembly 54 is disengaged by the supply of pressurized hydraulic fluid flow into the associated brake release actuator 72. This flow of pressurized hydraulic fluid flow overcomes the spring force of the spring 70 and releases the park brake 68.

The park brake 68 of each park brake assembly 54 includes any conventional interleaved friction disks and backing plates, disk-type or shoe-type brake that is engaged by the associated spring 70 and that is disengaged by hydraulic fluid flow into the associated brake release actuator 72. Each brake release actuator 72 includes a piston chamber 78 and a piston 80 which is slidably mounted in the piston chamber 78 and which is coupled to the park brake 68. The spring 70 is mounted in one end of the piston chamber 78 so as to bias the piston 80 towards the applied position of the park brake 68.

The source 74 is coupled to the solenoid-activated control valve 76 by a hydraulic supply conduit 82 of the hydraulic circuit 66 and receives hydraulic fluid from a hydraulic reservoir 84 by a hydraulic feed conduit 86 of the hydraulic circuit 66. The source 74 is a mechanically, electrically, or hydraulically operated pump that is operated either directly or indirectly by the vehicle's engine 38. The source 74 also generates hydraulic fluid for other hydraulically-operated components of the vehicle 14 and supplies the pressurized fluid to these components by a conduit (not shown). A one-way check valve 88 is provided along the hydraulic supply conduit 82 between the source 74 and the solenoid-activated control valve 76 to only allow flow into the solenoid-activated control valve 76. The control valve 76 is coupled to the brake release actuator 72 by a hydraulic transfer conduit 90 of the hydraulic circuit 66, and is coupled to the hydraulic reservoir 84 by a hydraulic drain conduit 92 of the hydraulic circuit 66.

The control valve 76 is connected to an electrical power source (not shown). Other means for actuating the control valve 76 are within the scope of the present disclosure. In an embodiment, the control valve 76 is removably positioned within a receptacle 94 of a hydraulic fitting interface 96 in the chassis 16 of the work vehicle 14. A biasing means 98, such as a spring, is within the receptacle 94 to bias the control valve 76 into so that the park brake 68 will move into the applied position. The receptacle 94 of the hydraulic fitting interface 96 is sized to an ISO standard hydraulic fitting. The receptacle 94 is in fluid communication with a first port 100 of the hydraulic fitting interface 96 that is sealingly coupled to the supply conduit 82, a second port 102 of the hydraulic fitting interface 96 that is sealingly coupled to the transfer conduit 90 and a third port 104 of the hydraulic fitting interface 96 that is sealingly coupled to the drain conduit 92.

The control valve 76 is positionable in two configurations; a first configuration which places the park brake 68 into the applied position, and a second configuration which places the park brake 68 into the released position. To move park brake 68 into the applied position as shown in FIG. 3, the control valve 76 is controlled by the control system 24 to direct hydraulic fluid from the piston chamber 78, through transfer conduit 90, through the port 102, through the control valve 76, through the port 104, to the drain conduit 92 to return the hydraulic fluid from the piston chamber 78 to the hydraulic reservoir 84. Since the piston chamber 78 is not sufficiently pressurized, the spring 70 expands which causes the piston 80 to slide within the piston chamber 78 (move to the right in FIG. 3) and engage the park brake 68. To move the park brake 68 into the released position, the control valve 76 is controlled by the control system 24 to direct hydraulic fluid from the hydraulic reservoir 84, through the hydraulic feed conduit 86, through the source 74, through the hydraulic supply conduit 82 and check valve 88, through the port 100, through the control valve 76, through the port 102, to the transfer conduit 90, and into the piston chamber 78. Upon a predetermined pressurization of the piston chamber 78, the spring 70 compresses which causes the piston 80 to slide within the piston chamber 78 (move to the left in FIG. 3) and release the park brake 68. In this state, the axle 42 operates in a driving mode to turn the wheels 32a, 34a without being resisted by the park brake assembly 54. The brake release requires the supply of pressurized hydraulic fluid to the brake release actuators 72. If the supply of pressurized hydraulic fluid to the brake release actuators 72 is not provided, such as by failure of the source 74 either hydraulically or electrically, the park brake 68 cannot be released.

The portable hydraulic park brake release assembly 12, see FIG. 4, overrides the force of the spring 70 to release the park brake 68 upon a determination that the park brake 68 is locked into the applied position. This allows for the work vehicle 14 to then be towed for service. The portable hydraulic park brake release assembly includes a portable conventional $CO_2$ cartridge 106 which is couplable to a check valve 108 within a portable adapter 110. The portable $CO_2$ cartridge 106 is a 12 g $CO_2$ cartridge, a 16 gram $CO_2$ cartridge, or a 20 g $CO_2$ cartridge.

Figure 5:
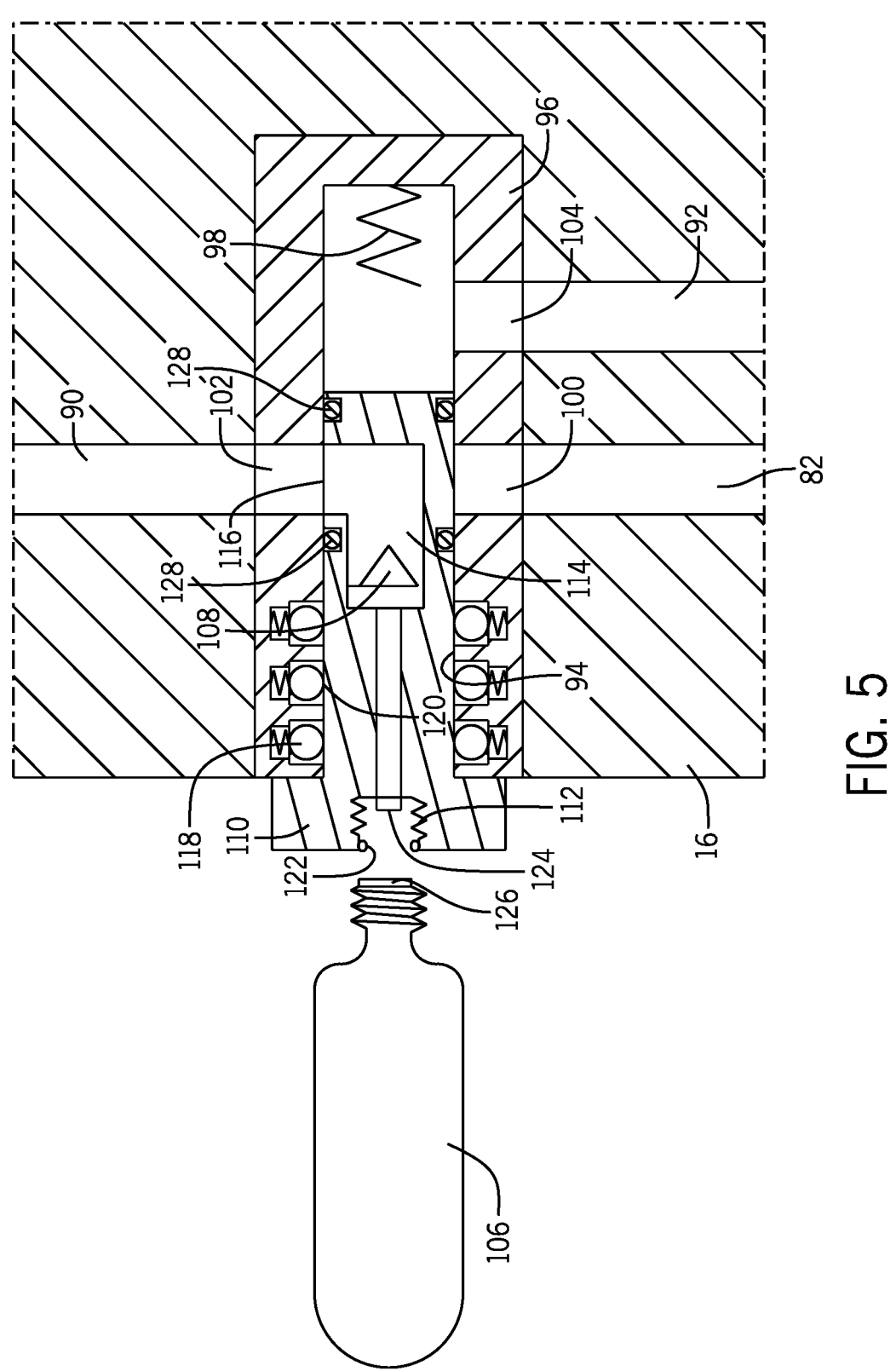
FIG. 5 is a schematic view of an example portable hydraulic park brake release assembly for use with the SAHR park brake assembly and method disclosed herein.

The adapter 110 has a receptacle 112 which extends from an opening at a first end thereof, and an internal passage 114 extending from the receptacle 112 to an opening or outlet 116 at a second end of the adapter 110. The check valve 108 is provided within internal passage 114 between the receptacle 112 and the outlet 116. The hydraulic fitting interface 96 and the adapter 110 have interengaging quick connect features which easily couple the adapter 110 to the hydraulic fitting interface 96 and allows the adapter 110 to be easily released therefrom. In an example as shown in FIG. 5, the hydraulic fitting interface 96 has a plurality of spring-loaded balls 118 which seat within circumferential grooves 120 of the adapter 110 (conversely the adapter 110 may have the spring-loaded balls 118 which seat within circumferential grooves 120 of the hydraulic fitting interface 96). The control valve 76 has like quick connect feature for interengaging with the hydraulic fitting interface 96.

A first end of the $CO_2$ cartridge 106 is inserted into the receptacle 112 of the adapter 110 and the outlet of the $CO_2$ cartridge 106 aligns with the inlet of the internal passage 114 within the adapter 110. The first end of the $CO_2$ cartridge 106 may threadedly engage with the adapter 110, or may be unthreaded. A seal 122 is provided between the first end of the $CO_2$ cartridge 106 and the adapter 110. In an embodiment, the adapter 110 has a nib 124 proximate the inlet to the internal passage 114 that punctures a membrane 126 in a head of the $CO_2$ cartridge 106 upon insert of the $CO_2$ cartridge 106 into the receptacle 112 to allow the $CO_2$ gas within the $CO_2$ cartridge 106 to pass into the internal passage 114 and then into the transfer conduit 90. An example of a conventional $CO_2$ cartridge is sold by CyclingDeal. Conventional $CO_2$ cartridges are portable, low cost, and can be easily stored in a glove compartment of the work vehicle 14. The check valve 108 is normally open, but closes when pressure in the internal passage 114 downstream of the check valve 108 equals the nominal operating pressure of the park brake 68 (i.e., pressure required to actuate park brake 68). This prevents the entrance of excess gas volume into the hydraulic transfer conduit 90 which could lead to cavitation. The pressure required to close the check valve 108 can be set to different values based upon the spring 70 being used. In an embodiment, the gas creates approximately 250 PSI within the piston chamber 78.

To effect the override, the control valve 76 is removed from the hydraulic fitting interface 96 and the portable hydraulic park brake release assembly 12 is inserted into the receptacle 94 of the hydraulic fitting interface 96. Suitable valves, seals etc. are provided to prevent the leakage of the hydraulic fluid from transfer conduit 90 when the control valve 76 is removed. Upon insertion of portable hydraulic park brake release assembly 12 into the receptacle 94, the outlet 116 of the adapter 110 aligns with the port 102 and transfer conduit 90, but isolates the ports 100, 104 and conduits 82, 92 from the transfer conduit 90. Seals 128 are provided to isolate the port 102. Upon activation of the $CO_2$ cartridge 106 by a suitable power source, which may be a battery, the gas is infused into the hydraulic circuit 66. The gas passes through the internal passage 114 and check valve 108, through the port 102, and into the transfer conduit 90 which is fluidically coupled to the piston chamber 78. The introduction of the gas into the transfer conduit 90 increases the volume of the hydraulic fluid along the transfer conduit 90 and in the piston chamber 78 to a sufficient amount to overcome the force of the spring 70. This causes the piston 80 to move to the released position and compress the spring 70 to move the park brake 68 to the released position. The hydraulic fluid in the hydraulic circuit 66 has a low volume, and the volume of the $CO_2$ gas introduced by injection from the cartridge 106 has a greater volume than the volume of the hydraulic fluid, thereby causing an expansion of the hydraulic fluid within the piston chamber 78 and retraction of the piston 80. The $CO_2$ gas introduced into the hydraulic circuit will escape past seals (not shown) along the transfer conduit 90, and will dissolve into the hydraulic fluid, however, the check valve 108 allows more gas to replenish the pressure until the $CO_2$ cartridge 106 is exhausted. Some of the gas will be dissolved into the hydraulic fluid, and when no longer under higher pressure may effervesce. However, since this portable hydraulic park brake release assembly 12 is only in an emergency, enough time will pass before normal operation is resumed to de-gas the SAHR park brake assembly 10. This prevents aeration from occurring in the hydraulic pumps (which could lead to noise and/or poor performance (for example, poor shift quality)). The hydraulic fitting interface 96 may be covered by a suitable cover (not shown) which is accessible from an outer surface of the work vehicle 14, and which can be opened for service.

In addition, activation of the portable hydraulic park brake release assembly 12 activates a park brake switch 130. If power is reinitialized, the activation of the park brake switch 130 indicates that there is an issue to the operator, and prevents operation of the work vehicle 14.

The present portable hydraulic park brake release assembly 12 can be used to release park brake assemblies that do not use electro-hydraulic solenoid valves.

Because the portable hydraulic park brake release assembly 12 provides a simple, low-cost and portable means for overcoming the park brake 68, the need to use a large, heavy hydraulic hand pump is avoided.

The foregoing describes one or more example in detail. Various other configurations are possible within the scope of this disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A system for a work vehicle comprising:
   a park brake assembly including:
      a park brake movable between an applied position and a released position;
      a spring proving an application force to bias the park brake into the applied position; and
      a hydraulic actuator selectively operable to move the park brake into the released position against the application force imposed by the spring, the hydraulic actuator including a piston mounted within a piston chamber;
   a control valve movable between a first configuration coupling the hydraulic actuator to a hydraulic reservoir to move the park brake into the applied position and a second configuration coupling the hydraulic actuator to a source of pressurized hydraulic fluid to move the park brake into the released position;
   a hydraulic conduit between the control valve and the piston chamber; and
   a portable hydraulic park brake release assembly including a portable adapter and a portable $CO_2$ cartridge removably coupled to the hydraulic conduit via the portable adapter, wherein upon activation of the $CO_2$ cartridge causes the park brake to move from the applied position to the released position;
   wherein the control valve is removably positioned within a hydraulic fitting interface fixedly coupled to the hydraulic conduit such that the control valve is removed from the hydraulic fitting interface and replaced with the $CO_2$ cartridge to activate the portable hydraulic park brake release assembly.

2. The system of claim 1, wherein the control valve is a solenoid valve.

3. The system of claim 1, wherein the control valve is removably positioned within a receptacle of the hydraulic fitting interface; and
   wherein the control valve is removed from the receptacle of the hydraulic fitting interface and replaced with the portable adapter and the portable $CO_2$ cartridge to activate the portable hydraulic park brake release assembly.

4. The system of claim 3, wherein the portable adapter has a first end configured to be removably received in the receptacle of the hydraulic fitting interface and a second end opposite the first end and defining a receptacle configured to removably receive a head of the portable $CO_2$ cartridge.

5. The system of claim 4, wherein the receptacle of the hydraulic fitting interface is sized to an ISO standard hydraulic fitting.

6. The system of claim 4, wherein the adapter includes an internal passage coupling a first opening in the first end of the portable adapter to a second opening in the second end of the portable adapter; and
   wherein when the portable adapter is connected to the hydraulic fitting interface, the receptacle of the hydraulic fitting interface is in fluid communication with the receptacle of the portable adapter.

7. The system of claim 6, further including seal being disposed between the receptacle of the hydraulic fitting interface and the first end of the portable adapter.

8. The system of claim 7, wherein the portable $CO_2$ cartridge is a 12 g $CO_2$ cartridge, a 16 gram $CO_2$ cartridge, or a 20 g $CO_2$ cartridge.

9. The system of claim 6, wherein the receptacle of the portable adapter is threaded to engage threads of the $CO_2$ cartridge.

10. The system of claim 6, wherein the receptacle of the portable adapter includes a nib to puncture a membrane of the $CO_2$ cartridge to release $CO_2$ gas to the hydraulic conduit via the portable adapter and the hydraulic fitting interface.

11. The system of claim 4, wherein the portable adapter includes a check valve disposed within the first end configured to be normally open and seat above a threshold pressure set to a nominal operating pressure to move the park brake to the applied position.

12. A method of overriding a hydraulic park brake assembly in a work vehicle, the park brake assembly including a park brake movable between an applied position and a released position, a spring proving an application force to bias the park brake into the applied position, a hydraulic actuator, having a piston mounted within a piston chamber, selectively operable to move the park brake into the released position against the application force imposed by the spring, and a control valve coupled to a hydraulic fitting interface and configured to couple the hydraulic actuator to a source of pressurized hydraulic fluid to move the park brake into the released position, the method comprising:

providing a portable hydraulic park brake release assembly, including a portable adapter and a portable $CO_2$ cartridge;

removing the control valve from the hydraulic fitting interface;

connecting the portable adapter to the hydraulic fitting interface;

connecting the portable $CO_2$ cartridge to the portable adapter; and activating the portable $CO_2$ cartridge to release $CO_2$ gas to a hydraulic conduit between the control valve and the piston chamber, and wherein the release of $CO_2$ gas into the hydraulic conduit causes the park brake to move from the applied position to the released position.

13. The method of claim 12, wherein the control valve is a solenoid valve.

14. The method of claim 12, wherein the portable adapter has a first end configured to be removably received in the receptacle of the hydraulic fitting interface and a second end opposite the first end and defining a receptacle configured to removably receive a head of the portable $CO_2$ cartridge.

15. The method of claim 14, wherein the receptacle of the hydraulic fitting interface is sized to an ISO standard hydraulic fitting.

16. The method of claim 14, wherein the adapter includes an internal passage coupling a first opening in the first end of the portable adapter to a second opening in the second end of the portable adapter; and wherein when the portable adapter is connected to the hydraulic fitting interface, the receptacle of the hydraulic fitting interface is in fluid communication with the receptacle of the portable adapter.

17. The method of claim 16, further including seal being disposed between the receptacle of the hydraulic fitting interface and the first end of the portable adapter.

18. The method of claim 16, wherein the receptacle of the portable adapter includes a nib to puncture a membrane of the $CO_2$ cartridge to release $CO_2$ gas to the hydraulic conduit via the portable adapter and the hydraulic fitting interface.

19. The method of claim 14, wherein the portable adapter includes a check valve disposed within the first end configured to be normally open and seat above a threshold pressure set to a nominal operating pressure to move the park brake to the applied position.

* * * * *